(12) United States Patent
    Attwood

(10) Patent No.: US 7,721,302 B2
(45) Date of Patent: May 18, 2010

(54) METHOD AND SYSTEM FOR INSTALLING A SELF-CONTAINED APPLICATION TO OPERATE WITH A PREVIOUSLY INSTALLED SELF-CONTAINED APPLICATION

(75) Inventor: Peter Kenneth Attwood, Middlesex (GB)

(73) Assignee: Oracle International Corporation, Redwood Shores, CA (US)

( * ) Notice: Subject to any disclaimer, the term of this patent is extended or adjusted under 35 U.S.C. 154(b) by 993 days.

(21) Appl. No.: 10/073,329

(22) Filed: Feb. 13, 2002

(65) Prior Publication Data

US 2003/0154318 A1    Aug. 14, 2003

(51) Int. Cl.
    *G06F 3/00*    (2006.01)
(52) U.S. Cl. .................................... 719/328; 719/331
(58) Field of Classification Search ................. 719/330, 719/331, 328, 310
    See application file for complete search history.

(56) References Cited

U.S. PATENT DOCUMENTS

| | | | | |
|---|---|---|---|---|
| 5,560,005 A | * | 9/1996 | Hoover et al. ................. | 707/10 |
| 6,088,694 A | * | 7/2000 | Burns et al. .................... | 707/8 |
| 6,314,566 B1 | * | 11/2001 | Arrouye et al. ............. | 717/148 |
| 6,718,543 B2 | * | 4/2004 | Arai et al. .................... | 717/158 |
| 6,732,179 B1 | * | 5/2004 | Brown et al. ................. | 709/229 |
| 7,162,596 B2 | * | 1/2007 | Popp et al. ................... | 711/162 |
| 2004/0226031 A1 | * | 11/2004 | Zimmerman et al. ........ | 719/331 |

OTHER PUBLICATIONS

Dave Marshall, "Remote Procedure calls(RPC)", Jan. 5, 1999, p. 1-19.*

* cited by examiner

*Primary Examiner*—Lechi Truong
(74) *Attorney, Agent, or Firm*—Hanify & King, P.C.

(57) ABSTRACT

A method of installing a first self-contained data handling application to operate with a second, previously installed, self-contained data handling application having at least one call routine which is executed when the second data handling application is operated, is described. The method comprises
  a) determining the presence of the second data handling application and, if it is present,
  b) generating a link to a software routine provided by, and utilizing when executed, the first data handling application, which will be executed by the call routine in the second data handling application.

5 Claims, 2 Drawing Sheets

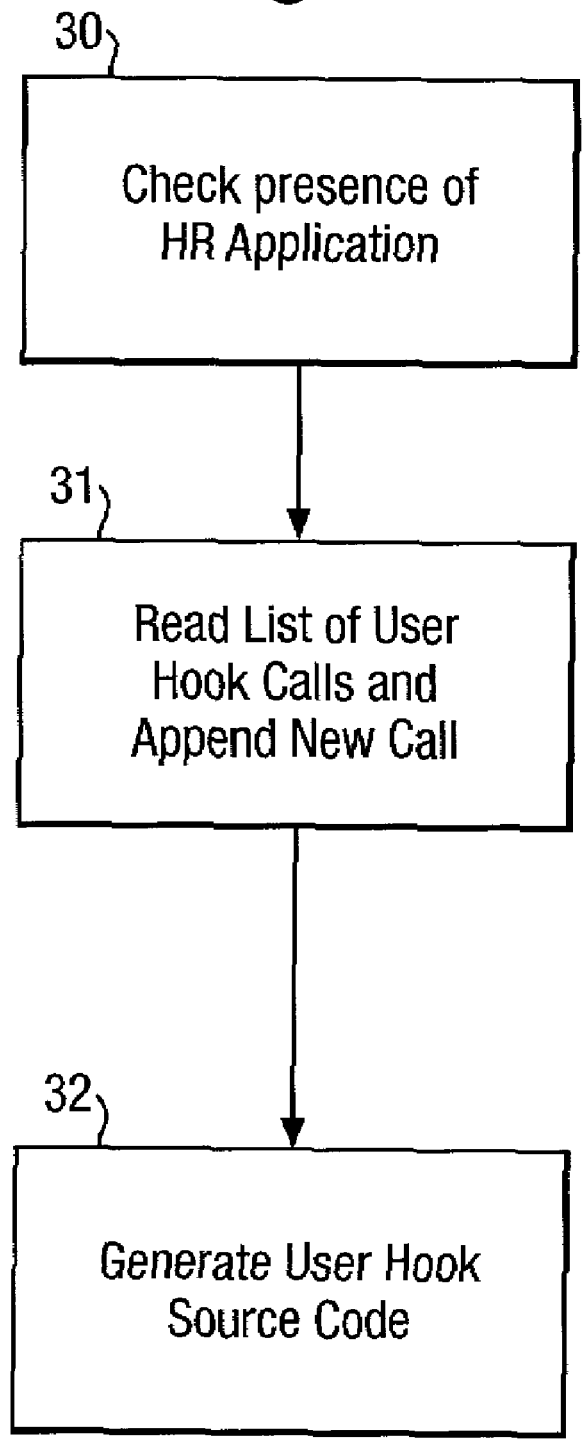

METHOD AND SYSTEM FOR INSTALLING A SELF-CONTAINED APPLICATION TO OPERATE WITH A PREVIOUSLY INSTALLED SELF-CONTAINED APPLICATION

FIELD OF THE INVENTION

The invention relates to a method of installing data handling applications and to a database system.

DESCRIPTION OF THE PRIOR ART

Traditionally, databases have been manufactured and sold as self-contained applications which, optionally, can be combined together depending upon customer requirements. A typical database system sold by Oracle Corporation comprises one or more data stores and associated Application Program Interfaces (APIs) which enable data to be entered into, modified and deleted from the respective tables. The APIs validate the data and may carry out certain other checks by implementing a suitable software process. Following validation, the APIs modify the data tables using corresponding Row Handler (RH) software.

Problems can arise, however, if there is any validation or processing dependency between different self-contained data storage applications.

This is best explained with an example. Consider a situation in which a Human Resource (HR) Application has been installed enabling employee records to be maintained. The user then wants to install the Oracle Time and Labor (OTL) Application which includes database tables and APIs which maintain a Time card entity. This needs to implement a business rule that an employee cannot be terminated in the HR Application if there are any open time cards for that employee in the OTL Application. The database tables and APIs which maintain employee data are maintained in the (HR) Application.

In the past this would be implemented by the OTL development team writing server-side PL/SQL code which performed the validation check. Details of the exact procedure and parameter names would need to be passed to the HR team responsible for the employee data Application. The HR team would then need to modify their employee APIs to call the OTL code. However, as the OTL team were releasing their first product version at a different time to the HR team they could not simply add a standard PL/SQL package procedure call. If they did, it would fail to compile when shipped to the customer because the OTL's code had not been shipped.

To resolve this the HR team would either:

a) Implement the call to the OTL validation code using dynamic SQL. This is more difficult to implement than a standard PL/SQL package procedure call so requires more development effort and cost. It also executes more slowly at run-time.

b) Maintain two versions of the same file(s). This means any bug fixes need to be applied to both versions and the correct version is released to customers with and without the OTL's code. This approach is very difficult to manage, especially when other code changes are applied with different criteria. Hence greater development costs as multiple versions of the same file need to be maintained. Testing is more difficult and costly as various product install combinations should be verified. It also risks customer satisfaction when the incorrect version is supplied.

In any event, the user would not be able to implement the full OTL Application until an updated version of the HR application had been installed.

SUMMARY OF THE INVENTION

In accordance with a first aspect of the present invention, a method of installing a first self-contained data handling application to operate with a second, previously installed, self-contained data handling application having at least one call routine which is executed when the second data handling application is operated comprises a) determining the presence of the second data handling application and, if it is present, b) generating a link to a software routine provided by, and utilizing when executed, the first data handling application, which will be executed by the call routine in the second data handling application.

In accordance with a second aspect of the present invention, a database system comprises first and second self-contained data handling applications, the second data handling application having at least one call routine which is executed when the second data handling application is operated, the call routine causing a software routine provided by, and utilizing, the first data handling application, to be executed.

With this invention, the first and second data handling applications can be created separately. The invention utilizes the fact that the second data handling application includes at least one call routine which can be utilized to provide a link with the software routine in the first data handling application.

In some cases, the call routine may define a list of addresses which are to be accessed upon execution of the call routine, each address corresponding to a particular software routine. However, in order to increase the speed of operation in normal use, preferably step b) comprises, during installation of the first data handling application, creating source code defining the software routine for automatic execution by the second data handling application. Thus, the required source code is generated upon installation of the first data handling Application enabling the code to be implemented immediately.

The software routine provided by the first data handling application may provide a variety of functions, some of which may be independent of the actions otherwise carried out by the second data handling application. Typically, however, the software routine controls a data modification operation by the second data handling application in dependence upon data stored in the first data handling application.

In some cases, the software routine will cause a message to be created in the first data storage application. In the example described above (HR and OTL Applications), when a new employee is created in the HR application a message providing certain details about the employee could be sent to a factory supervisor using the OTL application. In another case, data may be created in a data table of the OTL application, for example a timecard could be created for a new employee.

The invention is particularly suited, however, for controlling certain data modification such as deletion in one application in dependence upon data in another application. Thus, in the example mentioned above, an employee should not be deleted from the HR application if a timecard remains open in the OTL application. The invention enables this problem to be overcome.

It should be understood that the call routine will not always be executed by the second data handling application. This will depend upon the task carried out by the second data handling application. In the example mentioned above of HR and OTL Applications, the call routine will be executed during creation, modification and deletion of employee data.

The invention also extends to a computer program product including code defining a first self-contained data handling application for use with a second self-contained data handling application having at least one call routine which is executed when the second data handling application is operated; and code defining installation software for:

c) determining the presence of the second data handling application and, if it is present, d) generating a link to a software routine provided by, and utilizing when executed, the first data handling application, which will be executed by the call routine in the second data handling application.

BRIEF DESCRIPTION OF THE DRAWINGS

An example of a method and system according to the invention will now be described with reference to the accompanying drawings, in which:—

DETAILED DESCRIPTION OF EMBODIMENT

Figure 1:
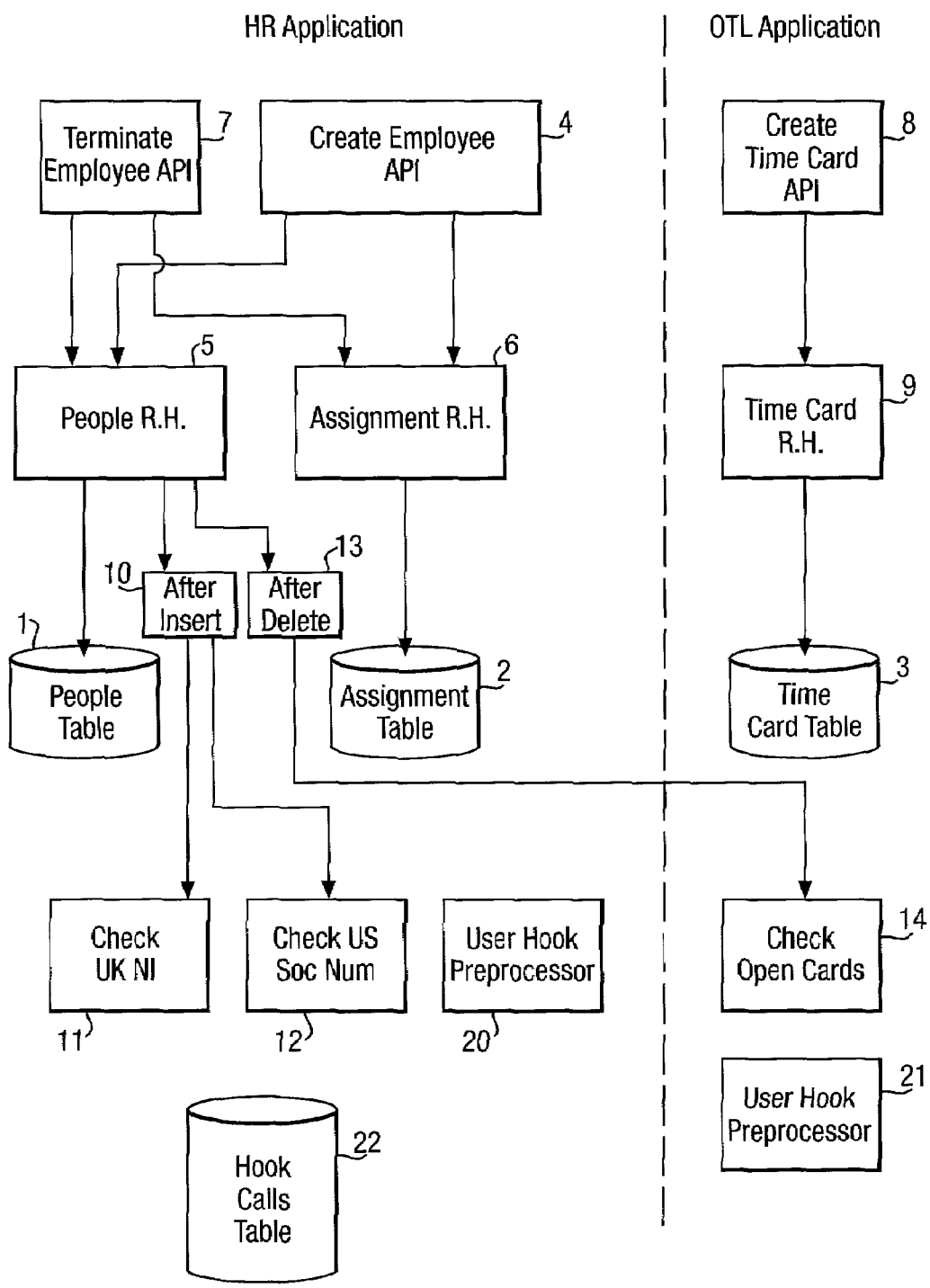
FIG. 1 is a schematic, block diagram of the apparatus showing the primary software modules; and, FIG. 2 is a flow diagram illustrating the installation process.

The system shown in FIG. 1 comprises a database holding, in this example, three database tables 1, 2, 3 identified as the people table, assignment table, and time card table respectively. In practice, one or more of these tables may be located in different physical locations and indeed different sections of one table could be located in different places.

A processing system (not shown) controls access to and from the tables 1-3 and implements a number of different, self-contained data handling applications of which two are illustrated in FIG. 1 (the HR Application and the OTL Application). These applications are self-contained in the sense that a customer could purchase either application without the other and it will run in a self-contained manner.

The HR application is intended to enable basic data to be stored relating to employees while the OTL Application is intended to store time card related data.

The software for controlling each application has the same general form being broken down into software modules including one or more Application Program Interface modules (APIs) and Row Handler modules (RH). Each API module provides an insulating layer between the user and the data-model and comprises a PL/SQL package that provides data validation and manipulation. The RHs take the data from the APIs and may carry out further validation before finally causing it to be stored in the appropriate table 1-3.

Each Row Handler module contains the software to perform insert, update, delete and lock tasks on a single database table. This includes validation checks and the actions required to maintain the data in that database table. The row handler validation checks verify the individual data values are correct. For example, when setting or changing a Person's nationality the row handler contains the software to verify the nationality value is correct.

The API module contains the software to perform a single business process. It also contains validation, but just to verify it is appropriate to allow that process to be performed.

In the example shown in FIG. 1, the HR Application comprises a create employee API 4 coupled to a people Row Handler 5 and an Assignment Row Handler 6. In addition, the HR Application includes a terminate employee API 7 coupled to the people Row Handler and Assignment Row Handler 5, 6. It will be appreciated that in practice there may be more than these two APIs, RHs and tables in the HR Application.

The RHs 5, 6 include a number of call routines, or "user hooks" which cause certain software to be implemented when they are reached. This software is listed in a hook calls Table 22 and generated when the HR application is installed, by a preprocessor program 20.

In this example, it is desired to check the format of the employee's National Insurance number (if a UK employee) or social security number (is a US employee). Suitable validation routines have previously been created and stored separately from the people Row handler 5 as indicated at 11, 12.

The preprocessor program 20 will generate the "after_insert" processing code 10. This will contain source code to first identify the current legislation code and then to call the appropriate routines (if any) 11, 12.

The OTL application includes a create timecard API 8 linked to a time card Row Handler 9 which in turn is linked to the time card table 3.

In a typical situation with which this invention is concerned, the HR Application is already installed at a user site. The user then wants to add the OTL Application but the OTL application needs to control certain actions carried out by the HR Application as will be described in more detail below. To enable this to be achieved, the OTL application makes use of the call routines or user hooks already provided in the people RH 5.

To enable these links to be installed, the OTL application includes user hook preprocessor software 21.

When the OTL application is loaded onto the user's system, the user hook preprocessor 21 first carries out a check to determine the presence of the HR Application (step 30, FIG. 2).

If it detects the presence of an HR Application, the preprocessor 21 then appends 31 the address of each software routine within the OTL Application which is to be implemented upon processing reaching the corresponding user hook in the HR application, into the table 22. Typically, the table 22 will be divided into sections, one for each user hook.

Finally, the user hook preprocessor 21 will read any existing software previously created at 10, 13, regenerate this and add software which the OTL application requires to be executed, and store the resultant software 10, 13 as appropriate. (Step 32).

In this example, the OTL application will require a routine "check open cards" 14 to be run when the people RH 5 reaches the "after delete" user hook. Thus, at installation, the preprocessor 21 writes suitable code 13 to cause the software routine 14 to be executed.

Following installation of the OTL application, when a new employee is to be entered, the user implements the create employee API 4 which presents him with an entry form on a screen with fields into which he enters the appropriate employee information. This will include items such as sex, age, address and the like. It will also include the employee's Assignment. Certain validation checks are carried out by the API 4, for example to ensure that the specified person type is an Employee type and not an Applicant or Ex-Employee type. The Assignment data and certain of the other data relating to the employee is passed to the Assignment RH 6 while non-Assignment data is passed to the people RH 5.

The Assignment RH 6 then causes the Assignment data to be loaded onto the Assignment table 2 against a suitable identifier corresponding to that employee.

The people RH 5 also implements a storage process but at a certain point in that process, prior to finally loading the data onto the people table 1, the people RH process reaches the User Hook "After Insert".

At this point a legislation check is carried out as defined by code 10. Thus when the HR application is used for UK employees, routine 11 will be executed. For US employees, routine 12 will be executed. For Japanese employees neither 11 or 12 will be executed. As employees for more than one legislation can be held in the same database then the decision on which routine to call is made when the employee is created in the database. If the legislation check is satisfactory and assuming that all other additional routines at this point find valid data, the people RH continues and the data is stored in the people table.

At the same time, or later, a timecard is created for the new employee, the user accessing the create time card API 8. He enters the required details of the employee which are then passed to the timecard RH 9 which loads them onto the time card table 3.

This time card is then updated on a regular basis, for example daily, with time keeping information about the employee.

If it is desired to remove an employee from the database then the user executes the terminate employee API 7 within the HR Application. This terminate employee API 7 causes the Assignment RH 6 to remove the data from the assignment table 2 and also causes the people RH 5 to remove data from the people table 1. Before this is complete, however, the process reaches an "After Delete" User Hook which calls routine 13 which, during installation, has been provided with software to run a routine 14 provided within the OTL Application by the user hook preprocessor 21. Thus, the people RH process will call the routine 14 "Check Open Cards" and this will perform the check using the employee data to see whether an open time card still exists for that employee on the Table 3. If it does, it will return an appropriate message and the people RH process will terminate and issue a message to the user to the effect that a time card for this employee remains open and should be closed. Alternatively, if there is no open time card on the Table 3, the check open cards routine 14 will return a valid reply allowing the terminate process to be completed and the data is removed from the person table 1.

The implementation of User Hooks and the processing required is described in more detail in "Implementing Oracle HRMS Release Iii" published by Oracle Corporation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media that should be used to carry out the distribution. Examples of computer readable media include recordable-type media such as floppy disk, a hard disk drive, RAM and CD-ROMs as well as transmission-type media, such as digital and analogue communications links.

I claim:

1. A computer implemented method of installing a first self-contained data handling application to operate with a second, previously installed, self-contained data handling application having at least one call routine which is executed when the second data handling application is executed and causes a software routine of the first self-contained data handling application to be executed, wherein the software routine of the first self contained data handling application controls a data modification operation by the second self-contained data handling application in dependence upon data stored in the first self-contained data handling application, the method comprising: a) detecting the presence of the second data handling application; and b) writing source code to cause the call routine of the second self-contained data handling application to cause the software routine of the first self-contained data handling application to be executed, wherein the first self-contained data handling, application and the second, previously installed, self contained data handling, application are operable to execute without each other, wherein the computer implement method is performed by a computer.

2. A method according to claim 1, wherein the call routine is only implemented by the second, previously installed, self-contained data handling application under certain predetermined conditions.

3. A database system comprising:
    a processor operable to execute computer program code; and
    a memory operable to store computer program code defining a first self-contained application and computer program code defining a second, previously installed, self-contained data handling applications, where each of the computer program codes is executable by the processor, the second self-contained data handling application having at least one call routine which is executed by the processor when the second self-contained data handling application is executed and causes a software routine provided by the first self-contained data handling application, to be executed by the processor, wherein the software routine is made available to the second self-contained data handling application upon installation of the computer program code defining the first self-contained data handling application and controls a data modification operation by the second self-contained data handling application in dependence upon data stored in the first self-contained data handling application, by a) detecting the presence of the second data handling application; b) writing source code to cause the call routine of the second self-contained data handling application to cause the software routine of the first self-contained data handling application to be executed, wherein the first self-contained data handling, application and the second, previously installed, self-contained data handling, application are operable to execute without each other.

4. A system according to claim 3, wherein the call routine is only implemented by the second self-contained data handling application under certain predetermined conditions.

5. A computer program product including a computer readable storage medium storing code executable by a processor for defining a first self-contained data handling application for use with a second, previously installed, self-contained data handling application having at least one call routine which is executed when the second data handling application is operated and causes a software routine of the first self-contained data handling application to be executed, wherein the software routine of the first self contained data handling application controls a data modification operation by the second self-contained data handling application in dependence upon data stored in the first self-contained data handling application; and code defining installation software for: a) detecting the presence of the second data handling application; and b) writing source code to cause the call routine of the second self-contained data handling application to cause the software routine of the first self-contained data handling application to be executed, wherein the first self-contained data handling, application and the second, previously installed, self contained data handling, application are operable to execute without each other.

* * * * *